Dec. 22, 1931.  W. R. HUME  1,837,324
APPARATUS FOR CENTRIFUGALLY MANUFACTURING OR LINING PIPES
Filed Nov. 20, 1928  2 Sheets-Sheet 1

Inventor:
Walter Reginald Hume
By [signature]
Attorney

Inventor:
Walter Reginald Hume

Patented Dec. 22, 1931

1,837,324

UNITED STATES PATENT OFFICE

WALTER REGINALD HUME, OF MELBOURNE, VICTORIA, AUSTRALIA

APPARATUS FOR CENTRIFUGALLY MANUFACTURING OR LINING PIPES

Application filed November 20, 1928, Serial No. 320,697, and in Australia January 9, 1928.

This invention relates to the moulding or lining of pipes and like hollow bodies by centrifugal force.

One of the objects of the invention is to provide an improved method for moulding concrete pipes or lining metal pipes by centrifugal action, which is cheaper and speedier to carry out in practice than existing methods.

Another object is to provide apparatus for carrying out the invention.

The improved method is characterized by placing a mould or a pipe, within which centrifugalization is to occur, upon the upper stretch of an endless supporting and driving band which is normally slack around a pulley and a guide member, so that the mould or pipe forms by its weight, and seats within, an open topped depression in said band and places the latter in tension whereby the lineal travel of said band rotates the mould or pipe while the latter is supported in the open topped depression. The advantages obtainable by following the method will be more apparent hereinafter.

According to a preferred form of the present invention two or more endless belts or bands are arranged to pass over guide members or pulleys mounted on parallel shafts spaced at a suitable distance apart so as to permit of the suspension of one or more pipes or moulds upon the upper stretches of the endless bands between said pulleys. The pipes or moulds are thus supported and driven by the endless belts or bands and are accommodated within the bights or depressions of the upper stretches of said bands between the spaced pulleys.

Although in most instances it may be necessary or preferable to employ two or more endless belts, nevertheless, if the article to be rotated is relatively short and/or an endless belt of comparatively great width is utilized, a single belt may be employed and arranged to pass around a set of guide members or pulleys to support and rotate a pipe or mould as before mentioned.

It has been found that owing to the flexible or yielding nature of the endless supporting and driving bands that the pipes or moulds rested thereon do not receive any appreciable vibratory or shaking movements which occur when they are rotated by frictional contact with solid members such as the wheels or rollers generally used in connection with the centrifugal process of moulding or lining pipes with cementitious material. After careful observation and experiment I have ascertained that such vibratory or shaking action is necessary or at least highly advisable for the proper consolidation of the cementitious material during the centrifugal process, and the present invention also provides a method and means for imparting such vibratory movements to the pipes or moulds while they are suspended upon and rotated by endless bands as previously mentioned.

Referring to the drawings which form part of this specification:—

Figure 1:
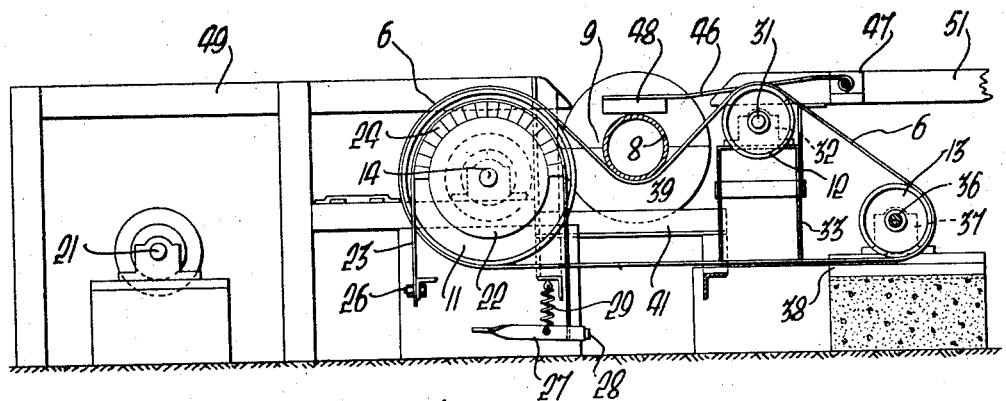
Figure 1 is a part sectional side view of apparatus according to one form of the invention, taken approximately on the line I—I in Figure 2.
Figure 2:
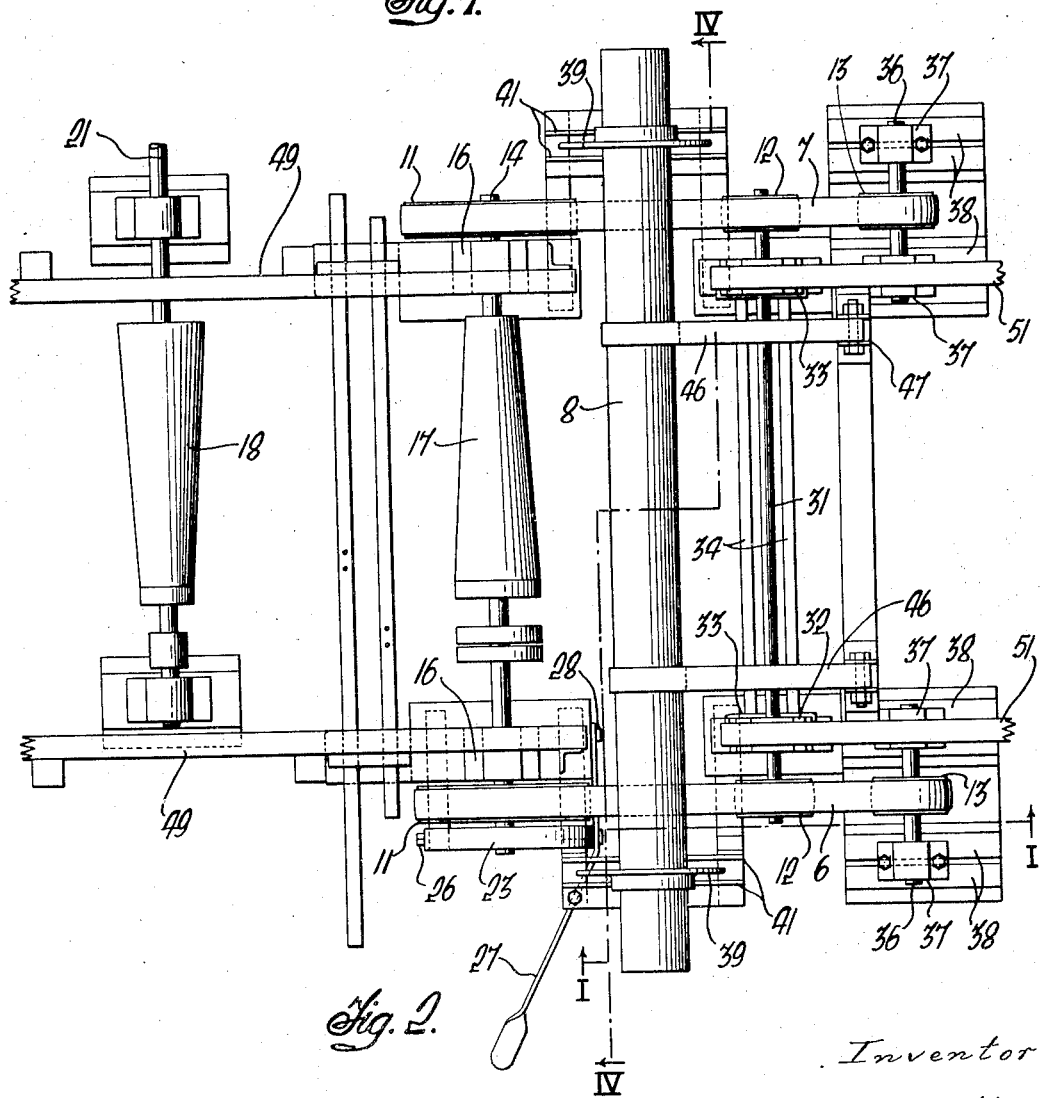
Figure 2 is a plan of the apparatus.
Figure 3:
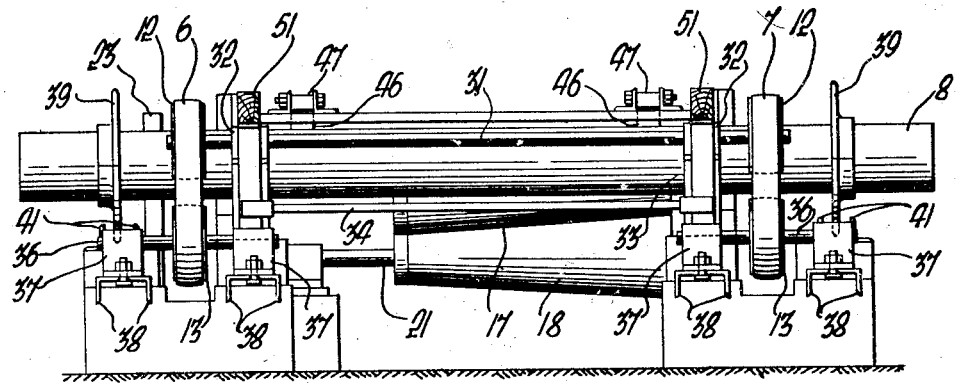
Figure 3 is an end view looking from the right hand side of Figure 1.
Figure 4:
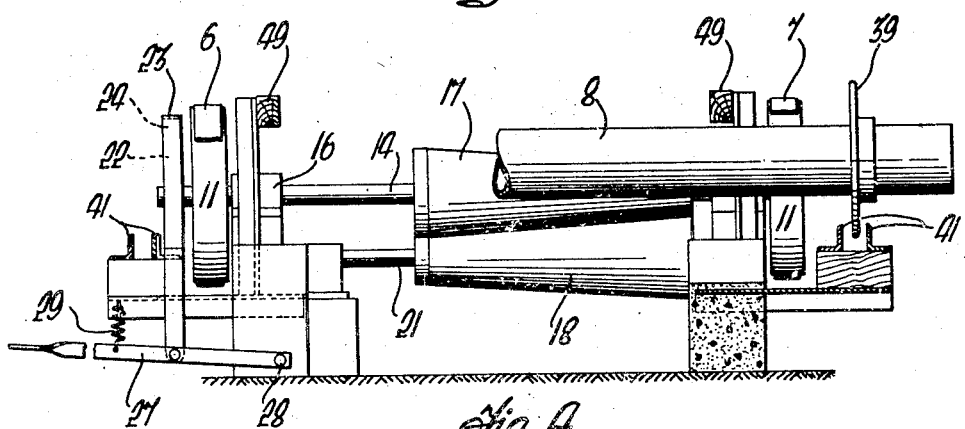
Figure 4 is a transverse sectional view taken approximately on the line IV—IV in Figure 2.

The drawings illustrate, by way of example, a preferred form of apparatus for carrying the invention into effect and according thereto, two endless belts or bands 6, 7, are provided and arranged to pass around pulleys or guide members so that a pipe, mould or the like 8, may be supported within the bights 9 of the upper stretches of the bands and place the latter in tension. The bands 6, 7, each with a set of pulleys, one of each set being a driver, are spaced a suitable distance apart so that a pipe or mould may be supported adjacent its ends by said bands. One or more additional bands with pulleys may be provided to support the pipe or mould intermediately of its length. This may be advisable if the pipe or mould is relatively long.

Each set may consist of two pulleys of equal diameter between which the pipe or mould is positioned, but in Figures 1 to 4 each set of pulleys comprises a driving pulley 11, a second and smaller pulley 12, so arranged that the bight or depression 9 in the upper stretch of the band extends between it and the driver 11, and a third pulley 13 which is adjustable towards and from the other two to permit adjustment of the depth of the bight or depression 9 according to requirements, such as the weight or size of the pipes or moulds to be treated, and to ensure that the tension of the various bands is uniform.

The pulleys may be curved or flanged to prevent accidental displacement of the belts.

The driving pulleys 11 of the respective sets are mounted on a common shaft 14 supported by bearings 16 and which may be driven at any desired speeds, through the medium of cones 17, 18, and belt gear from a shaft 21 connected with a source of power. Any other suitable driving means may of course be provided but it should preferably include variable speed means to enable the operator to readily control the speed of rotation of the pipe or mould 8.

A braking device may also be provided for the driving pulleys 11 and such device may include a drum or disc 22 fixed to the shaft 14, and a brake band comprising a thin strip 23 of spring steel of U form having brake blocks 24 of wood or the like attached to its semi-circular portion so that they may be forced into contact with the periphery of the disc 22. One end of the brake band 22 may be anchored, as at 26, and the other end attached to a foot lever 27 pivoted as at 28. A spring 29 may be provided to normally hold the brake band and blocks clear of the disc 22.

The second pulleys 12 may be fixed to a shaft 31 supported by bearings 32 on frames 33 which may be braced by stays 34, these pulleys 12 being arranged so that their upper portions are preferably level with the upper portions of the driving pulleys 11.

The third or adjusting pulleys 13 may be fixed to short shafts 36 supported by bearings 37 which may be adjusted along rails or guides 38 extending horizontally at right angles to the axes of the pulleys.

If each set of pulleys consists of two pulleys of equal diameter as before mentioned any suitable device, such as a weight, spring or screw means may be provided for each band in order to permit variation of the depth of the depression 9.

Figure 6:
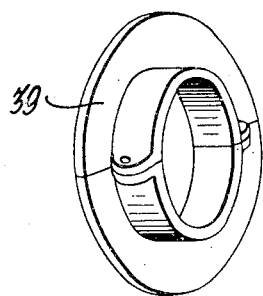
Figure 6 is a detail of a ring which may be applied to a pipe or mould in order to prevent end play thereof while rotating.

In order to prevent excessive longitudinal movement of the pipe or mould being rotated by the bands 6, 7, one or more rings or flanges 39 may be detachably positioned around each pipe or mould so as to rotate therewith and between guide members 41. The rings 39 are preferably made in halves as seen in Figure 6 and clamped around the pipe or mould by screws or the like.

If desired the guide members 41 may be provided with relatively small anti-friction rollers adapted to contact with the sides of the flanges 39.

To impart vibratory movement to a pipe or mould while it is being rotated by the bands 6, 7, a contact member (or members) is (or are) engaged with the pipe or mould or a part rotating therewith, so that the combined centrifugal and vibratory actions will cause cementitious or like material to be effectively consolidated within the pipe or mould.

Each contact member may consist of an arm, bar or the like 46 of wood, metal or other material of sufficient weight to disturb the rotary motion of the pipe or mould. As shown in the drawings one end of each arm 46 may be hinged to a suitable frame 47 so that it may be readily swung into and out of operative position, the free end of the arm carrying a block 48 which in use rests upon the pipe or mould.

To facilitate operations ramps or platforms 49, 51, may be provided along which the pipes or moulds may be rolled before and after treatment. If the pipes are sufficiently light they may be lifted manually from the bands 6, 7, onto the delivery ramp 51, but in other cases mechanical lifting gear may be provided for this purpose.

By the invention pipes and moulds may be placed in operative position and removed therefrom with a minimum expense of time and labour, and the use of bearing rollers to support the ends of the pipes or moulds, and of gear to carry them into and out of position is eliminated. The cost of the plant as well as frictional losses and driving power are reduced to a minimum. Production is thus accelerated and cheapened and a highly satisfactory product is assured.

A further important advantage of the invention is that pipes or moulds having rough, irregular or badly formed exteriors may be effectively rotated at high speed owing to the flexibility of the belt or band and its ability to accommodate itself to the external surface of a pipe or mould. For instance in lining electrically welded pipe, the usual external ridge or raised seam extending along the welded joint will bed into the belt or band during rotation of the pipe which will therefore proceed without jolts or jars.

In lining pipes with cementitious, bituminous or such like materials it is most important that the lining should be of uniform thickness throughout and concentric with the pipe. The present invention permits of this being obtained even when the pipe is badly formed or has surface irregularities, for the reason that the pipe is supported solely by the flexible belt or band which rotates the pipe by frictional contact with its periphery. Hence if the pipe is not a true circle or cylinder the band or bands function to automatically balance the pipe during rotation and compensate for such irregularity of shape or surface projections. Such action is not possible if the pipe is arranged to rotate about a fixed centre and has fixed or rigid supports as is the general practice at present. In such instances there is a marked tendency for the lining to become eccentric which of course entails that the lining will vary in thickness and possibly in density also.

Figure 5:
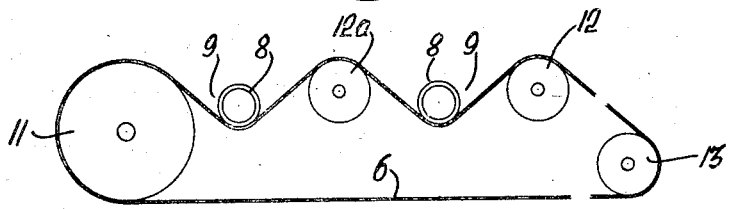
Figure 5 is a diagrammatic view of an arrangement embodying the invention suitable for rotating a series of pipes or moulds simultaneously.

Should it be desired to simultaneously rotate a series of pipes or moulds the upper stretches of each band 6 may be arranged to pass over one or more intermediate pulleys 12a as indicated diagrammatically in Figure 5, so that the various pipes or moulds 8 may be simultaneously supported on and driven by said bands within the bights 9 between the various pulleys 11, 12a, 12. One or more contact members as beforementioned may be provided to bear against each pipe or mould so that it receives vibratory movements in addition to rotation.

During the centrifugal action the ends of the mould or pipe will be closed or partially closed by detachable caps or rings as usual.

When lining pipes with bituminous and such like mixtures the vibratory or shaking means need not be employed.

Having now described my invention what I claim as new and desire to secure by Letters Patent is:—

1. Apparatus for centrifugally manufacturing or lining pipes and like hollow bodies with plastic material, comprising a set of guide members, an endless supporting and driving band extending around said guide members so that an open topped depression is formed in the upper stretch of said band between the guide members in order to accommodate a mould or pipe, and means for imparting lineal motion to said band.

2. Apparatus for centrifugally manufacturing or lining pipes and like hollow bodies with plastic materials, comprising laterally spaced sets of pulleys arranged in the same horizontal plane, and endless supporting and driving bands one adapted to extend around each set of pulleys which are so arranged that the upper stretches of the bands have laterally aligned and open topped depressions between their pulleys to accommodate a mould or pipe, one pulley of each set constituting a driver for its band.

3. Apparatus for centrifugally manufacturing or lining pipes and like hollow bodies with plastic materials, comprising parallel shafts extending in a horizontal plane, pulleys on each of said shafts at longitudinal intervals, the pulleys on one shaft being opposite the pulleys on the other shaft, endless supporting and driving bands extending one around each set of opposite pulleys and having in their upper stretches aligned open topped depressions to permit of a mould or pipe being rested therein, one pulley of each set constituting a driver for its band, and means for rotatitng said driver pulleys in synchronism.

4. Apparatus for centrifugally manufacturing or lining pipes, and like hollow bodies with plastic materials, comprising one or more sets of guide members each set numbering three or more, an endless supporting and driving band provided for each set and adapted to extend around same so that a plurality of open topped depressions is formed in the upper stretch of each band in order to accommodate a plurality of moulds or pipes, and means for imparting lineal motion to each band, whereby said moulds or pipes will be rotated simultaneously.

5. In apparatus for centrifugally manufacturing or lining pipes and like hollow bodies with plastic materials, two shafts extending parallel to each other in the same horizontal plane, one shaft being positively driven, a pair of pulleys mounted one on each shaft, and an endless supporting and driving band capable of extending slackly around said pulleys so that when a mould or a pipe in which centrifugalization is to take place is rested upon the upper stretch of the band, the mould or pipe forms by its weight and rests within an open topped depression in said band between said pulleys and takes up the slack in the latter.

6. In apparatus for centrifugally manufacturing or lining pipes and like hollow bodies with plastic materials, two shafts extending horizontally and parallel to each other, two pulleys mounted one on each of said shafts, an endless supporting and driving band capable of extending slackly around said pulleys so that when a mould or a pipe, in which centrifugalization is to take place, is rested upon the upper stretch of the band, the mould or pipe by its weight forms and rests within an open topped deperssion in said band between said pulleys and places the band in tension, and adjustable means bearing against said band in order to permit variation in the depth of said depression.

7. In apparatus for centrifugally manufacturing or lining pipes and like hollow bodies with plastic materials, two shafts extending horizontally and parallel to each other, variable speed driving mechanism connected to one shaft, a pulley fixed on the last mentioned shaft, a guide member on the other shaft opposite to said pulley, and an endless supporting and driving band capable of extending slackly around said pulley and guide member, so that when a mould or a pipe in which centrifugalization is to take place is rested upon the upper stretch of said band the mould or pipe forms by its own weight, and rests within, an open topped depression in said upper stretch between the pulley and the guide member and places the band in tension.

8. Apparatus for centrifugally manufacturing or lining pipes and like hollow bodies with plastic materials, comprising a set of guide members, an endless supporting and driving band adapted to extend slackly around said guide members until a mould or a pipe is placed upon the upper stretch of said band between said guide members, whereupon said mould or pipe forms and seats within an open topped depression in said upper stretch and places the band in tension, means for imparting lineal motion to said band, and adjustable means bearing against said band in order to permit of variation in the depth of said depression.

9. In apparatus for centrifugally manufacturing or lining pipes and like hollow bodies with cementitious material, a set of guide members, an endless supporting and driving band extending around said guide members so that an open topped depression is formed in the upper stretch of said band between the guide members in order to accommodate a mould or pipe, means for imparting lineal motion to said band whereby the mould or pipe will be rotated, and means for imparting vibratory motion to the rotating mould or pipe.

10. In apparatus for centrifugally manufacturing or lining pipes and like hollow bodies with cementitious material, a set of guide members, an endless supporting and driving band extending around said guide members so that an open topped depression is formed in the upper stretch of said band between the guide members in order to accommodate a mould or pipe, means for imparting lineal motion to said band whereby the mould or pipe will be rotated, and means for imparting vibratory motion to the rotating mould or pipe, said last named means comprising a contact member adapted by its own weight to bear against the periphery of the rotating mould or pipe or a part revolving therewith.

11. In apparatus for centrifugally manufacturing or lining pipes and like hollow bodies, a set of guide members, an endless supporting and driving band extending around said guide members so that an open topped depression is formed in the upper stretch of said band between the guide members in order to accommodate a mould or pipe, means for imparting lineal motion to said band whereby the mould or pipe will be rotated, and means for preventing excessive longitudinal movement of said mould or pipe while it is supported and rotated by said band.

12. In apparatus for centrifugally manufacturing or lining pipes and like hollow bodies, a set of guide members, and endless supporting and driving band extending around said guide members so that an open topped depression is formed in the upper stretch of said band between the guide members in order to accommodate a mould or pipe, means for imparting lineal motion to said band whereby the mould or pipe will be rotated, and means for preventing excessive longitudinal movement of said mould or pipe while it is supported and rotated by said band, said last named means comprising a ring adapted for detachable connection to said mould or pipe so as to rotate therewith and stationary stop members disposed adjacent said ring.

13. In apparatus for centrifugally manufacturing or lining pipes and like hollow bodies with plastic material, a set of guide members, an endless supporting and driving band extending around said guide members so that an open topped depression is formed in the upper stretch of said band to accommodate a mould or pipe, means for imparting lineal motion to said band whereby the mould or pipe will be rotated, and ramps along which the moulds or pipes may be rolled towards and away from said depression in the band.

In testimony whereof I affix my signature.

W. R. HUME.